United States Patent
Ardeli et al.

(10) Patent No.: US 9,825,909 B2
(45) Date of Patent: Nov. 21, 2017

(54) DYNAMIC DETECTION AND APPLICATION-BASED POLICY ENFORCEMENT OF PROXY CONNECTIONS

(71) Applicant: Aruba Networks, Inc., Sunnyvale, CA (US)

(72) Inventors: Ramesh Ardeli, Sunnyvale, CA (US); Venkatesan Marichetty, Danville, CA (US)

(73) Assignee: ARUBA NETWORKS, INC., Sunnyvale, CA (US)

(*) Notice: Subject to any disclaimer, the term of this patent is extended or adjusted under 35 U.S.C. 154(b) by 201 days.

(21) Appl. No.: 14/610,637

(22) Filed: Jan. 30, 2015

(65) Prior Publication Data
US 2016/0226825 A1    Aug. 4, 2016

(51) Int. Cl.
*H04L 29/06* (2006.01)
(52) U.S. Cl.
CPC ...... *H04L 63/0227* (2013.01); *H04L 63/0254* (2013.01); *H04L 63/0281* (2013.01); *H04L 63/20* (2013.01)

(58) Field of Classification Search
CPC ............ H04L 63/0227; H04L 63/0254; H04L 63/20; H04W 12/08
USPC ..................................... 726/12, 13
See application file for complete search history.

(56) References Cited

U.S. PATENT DOCUMENTS 8,055,767 B1 * 11/2011 Forristal ............. H04L 63/1416
370/230
2007/0234414 A1 * 10/2007 Liu ..................... H04L 63/0218
726/11

* cited by examiner

*Primary Examiner* — Yogesh Paliwal
(74) *Attorney, Agent, or Firm* — Hewlett Packard Enterprises Patent Department

(57) ABSTRACT

The present disclosure discloses a method and a network device for performing dynamic detection and application-based policy enforcement of proxy connections in a network. Specifically, a network device receives, from a client device, a packet in a session. The network device then determines whether the packet is transmitted to a proxy. In response to determining that the packet is associated with a different application classification or web content category during the same session, the network device re-applies network firewall policies to determine whether to allow or deny transmission of the packet to the proxy.

21 Claims, 10 Drawing Sheets

| REQUEST URI 400 | /news |
|---|---|
| HOST 420 | www.cnn.com\r\n |

FIG. 4A

| REQUEST URI 400 | www.cnn.com/news |
|---|---|
| HOST 420 | www.cnn.com\r\n |

DYNAMIC DETECTION AND APPLICATION-BASED POLICY ENFORCEMENT OF PROXY CONNECTIONS

FIELD

Embodiments of the present disclosure relate to content management by network devices. In particular, embodiments of the present disclosure describe a method and network device for performing dynamic detection of proxy connections and application-based policy enforcement of proxy connections in a network.

BACKGROUND

Proxy servers are deployed at various points in large number of companies to compress network traffic to save bandwidth or masquerade a client's Internet Protocol (IP) address. Depending on the deployment mode, the usage of proxy server can weaken the firewall policy enforcement, causing unwanted traffic to leave the network and malicious traffic to enter the network.

In stateful firewall architecture, typically a session entry is created on receipt of first packet of a connection with appropriate flags based on the access control list (ACL) lookup result. Moreover, the session entry is maintained till the connection ages out or gets reset. However, to support application-based policy enforcement, first few packets can be leaked till the session is classified by its associated application or categorized by its associated web content. Once the session is classified and/or categorized, the session is subjected to application-based firewall policies to determine whether to continue permitting the traffic or to deny the traffic.

Furthermore, after the session is classified and/or categorized, it will continue belonging to the same application or web-category till the session ages out. Therefore, determining whether to permit or deny the session needs only one ACL enforcement post classification. Since deep-packet inspection of packets is processor-intensive, once a session is classified and/or categorized, subsequent packets in the same session are not subjected to deep-packet inspection in order to support maximum concurrent connections and to have higher throughput. Continuously subjecting data packets of classified and/or categorized sessions through DPI can consume lots of central processor unit (CPU) cycles, resulting in lowered throughput of the system. Thus, once a session is classified and/or categorized, it is not subjected to DPI.

Nevertheless, proxy connections behave differently in that it exhibits persistency nature across multiple application types and web content categories. The Transmission Control Protocol/Internet Protocol (TCP/IP) stack on the client usually transmits traffic belonging to multiple applications or web-content categories on the same connection, if the traffic is going through a proxy server. This often breaks the network firewall policy enforcement, resulting in the network infrastructure mistakenly providing access to denied applications and/or denying access to allowed applications.

DETAILED DESCRIPTION

In the following description, several specific details are presented to provide a thorough understanding. While the context of the disclosure is directed to content management by network devices, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

FIG. 4A-4B show diagrams illustrating exemplary dynamic detection of proxy connections according to embodiments of the present disclosure.

OVERVIEW

Embodiments of the present disclosure relate to content management by network devices. In particular, embodiments of the present disclosure describe a method and network device for performing dynamic detection and application-based policy enforcement of proxy connections.

In general, embodiments of present disclosure solve the challenges to accurately identify proxy connections using deep-packet inspection, and subject such sessions through continuous deep-packet inspection to monitor for any transition of session to different applications or web content category than an initially classified application and/or categorized web content. Once a session is found to have transitioned between different applications and/or web content categories, the session is subjected to access control list (ACL) lookup again to determine whether traffic in the new application and/or web-content category should be permitted or denied according to the network firewall policies.

Since deep-packet inspection is processor-intensive, the packets of proxy connection that needs deep packet inspection (DPI) are filtered out so that only a subset of packets is subjected to DPI, and the rest are not subjected to DPI. Also, non-proxy connections will not be subjected to continuous deep-packet inspection, because the session would not carry any other traffic till the session ages out once the session is classified or categorized if no proxy server is involved. By subjecting only the needed packets of proxy connection to DPI, the firewall stack on the controller can accurately enforce application-based firewall policies for proxy connections while minimizing the processor usage for deep-packet inspection. As a result, the end users can have consistent experience of various types of traffic.

Figure 1A:
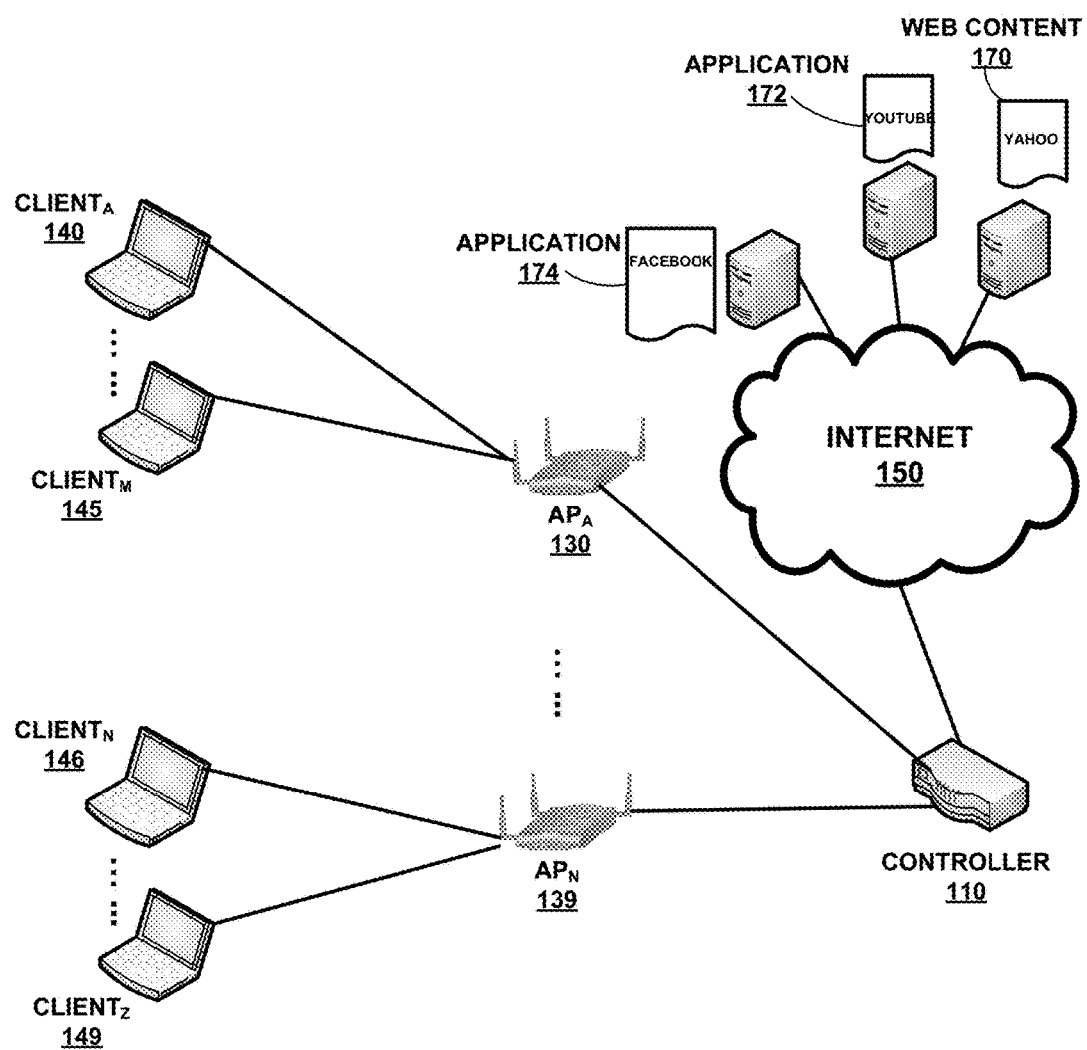
FIG. 1A-1B show exemplary network environments according to embodiments of the present disclosure.

With the solution provided herein, a network device receives, from a client device, a packet in a session. The network device then determines whether the packet is transmitted to a proxy. In response to determining that the packet is associated with a different application classification or web content category during the same session, the network device re-applies network firewall policies to determine whether to allow or deny transmission of the packet to the proxy Network Computing Environment FIG. 1A shows an exemplary network environment according to embodiments of the present disclosure. Specifically, FIG. 1A illustrates a network that includes at least a number of web servers that hosts a website, a web application, or other web contents. For example, web server 170 may host Yahoo® website; web application server 172 may host Youtube® application; web application server 174 may host Facebook® application; etc. Moreover, the network in FIG. 1 also includes Internet 150, a network controller 110, a number of access points (APs) (such as, $AP_A$ 130 to $AP_N$ 139), and a plurality of client devices, such as $Client_A$ 140, ..., $Client_M$ 145, $Client_N$ 146, ..., $Client_Z$ 149, etc.

Figure 1B:
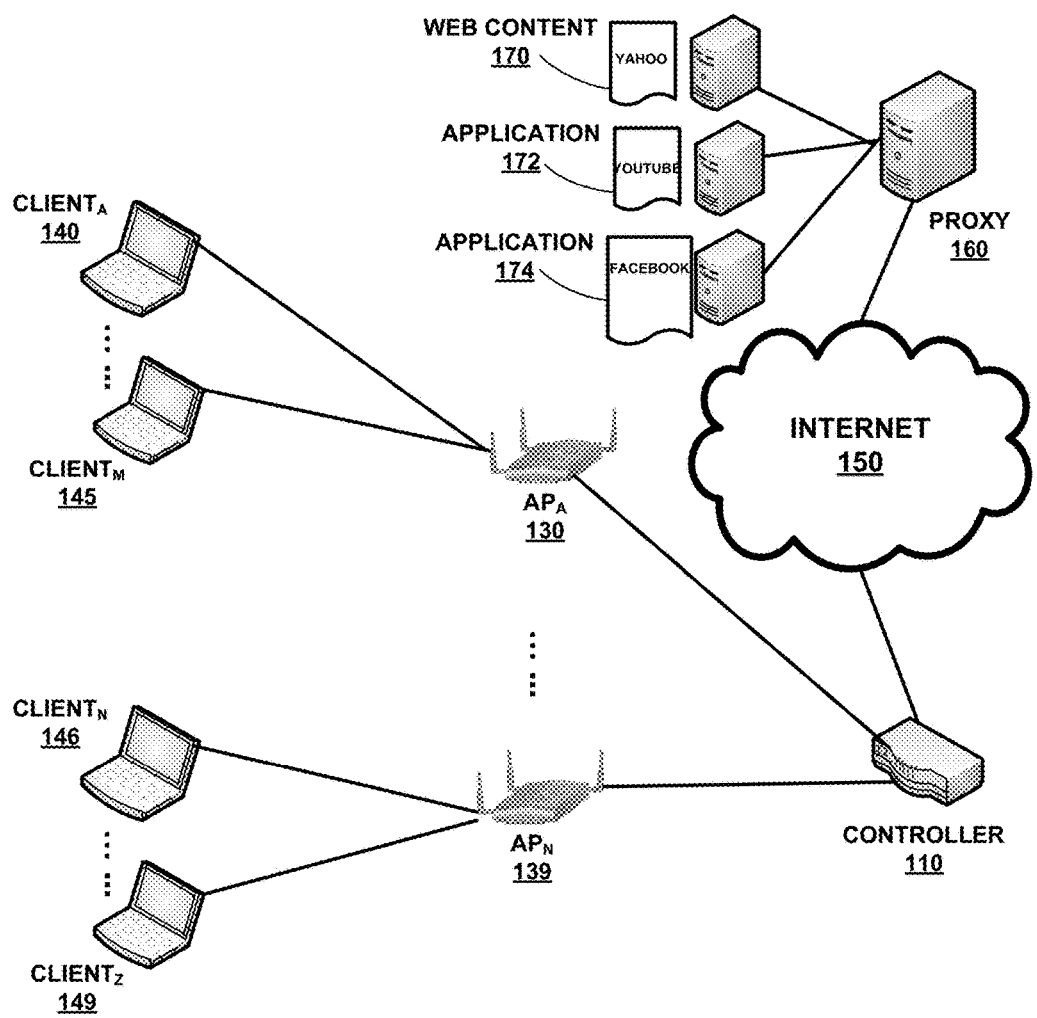

FIG. 1B shows another exemplary network environment according to embodiments of the present disclosure. Specifically, FIG. 1B illustrates a network that includes at least a proxy server 160, a number of web servers 170-174, Internet 150, a network controller 110, a number of access points (APs) (such as, $AP_A$ 130 to $AP_N$ 139), and a plurality of client devices, such as $Client_A$ 140, ..., $Client_M$ 145, $Client_N$ 146, ..., $Client_Z$ 149, etc.

Web servers 170-174 generally refer to a network computer system that processes requests via Hypertext Transfer Protocol (HTTP) or Hypertext Transfer Protocol Secure (HTTPS). HTTP generally refers to a network protocol that is used to distribute information by exchanging or transferring hypertext on the World Wide Web (WWW). Hypertext generally refers to structured text that uses logical links (hyperlinks) between nodes containing text. HTTPS layers the HTTP on top of the Secure Sockets Layer/Transport Layer Security (SSL/TLS) protocol, thus adding the security capabilities of SSL/TLS to standard HTTP communications to prevent security attacks, such as, wiretapping and man-in-the-middle attacks.

Note that, web servers 170-174 can also provide other services. In general, a service is an abstraction of web resources. A client device can be agnostic of how the server performs while fulfilling the request and delivering the response. The client device only needs to understand the response based on a mutually agreed application protocol, e.g., HTTP, FTP, etc.

Network controller 110 generally refers to a controlling device that manages other network devices such as wireless access points. Network controller 110 may handle automatic adjustments to radio frequency power, wireless channels, wireless authentication, and/or security, and deliver essential mobility services such as AppRF technology for OSI Layer 4-7 application control, multicast Domain Name System (DNS) optimization, IP roaming, and Security Assertion Markup Language (SAML) integration based on user roles, devices, applications and location.

Furthermore, network controller 110 can be combined to form a wireless mobility group to allow inter-controller roaming. In some embodiments, network controller 110 can centralize IP services and policy control across wired and wireless as well as simplify the integration of network security and third-party enterprise application platforms.

Web servers 170-174 may be connected to network controller 110 via an Internet 150. Alternatively, web server 160 may be a part of the same wired and/or wireless local area network that network controller 110 belongs to. In the network environment illustrated in FIG. 1A, web servers 170-174 are connected to network controller 110 without a proxy server. By contrast, in the network environment illustrated in FIG. 1B, web servers 170-174 are connected to network controller 110 through proxy server 160.

Proxy server 160 generally refers to a server that acts as an intermediary for requests from clients (e.g., $Client_A$ 140 to $Client_Z$ 149) seeking resources from other servers (e.g., web servers 170-174). A client device can connect to proxy server 160, requesting web service, such as a file, a connection, a web page, a web application session, or other resource available from a web server. Proxy server 160 evaluates the request as a way to simplify and control its complexity. Proxy server 160 can provide monitoring and filtering of web contents, improving performance, allowing access of service anonymously, enhancing internal network security, etc.

Access points, e.g., $AP_A$ 130 to $AP_N$ 139, generally refer to a set of wireless network devices that allow wireless client devices to connect to a wired network using IEEE 802.11 or related standards. The APs usually connect to a router via a wired network, but can also be an integral component of the router itself.

Each access point serves one or more client devices. For illustration purposes only, assuming that, in FIG. 1, a first set of client devices, such as $Client_A$ 140, ..., $Client_M$ 145, associate with $AP_A$ 130. Moreover, assuming that a second set of client devices, such as $Client_N$ 146, ..., $Client_Z$ 149, associate with $AP_N$ 139.

During operations, client devices (e.g., $Client_A$ 140 to $Client_Z$ 149) and servers (e.g., web server 160) exchange messages following a request-response pattern. Specifically, a client device (e.g., $Client_A$ 140) initially sends a request message. The request message will be received by $AP_A$ 130 that $Client_A$ 140 is associated with. $AP_A$ 130 then forwards the request to the network infrastructure. In the example illustrated in FIG. 1, network controller 110 will receive the request message, inspect the network packet, apply network policies, and forward the request message to its destination (e.g., web servers 170-174). Then, a web server returns a response message. A server (e.g., web servers 170-174) may receive and process a large number of requests from many different client devices.

Firewall Policy Enforcement without Proxy Server

Figure 2:
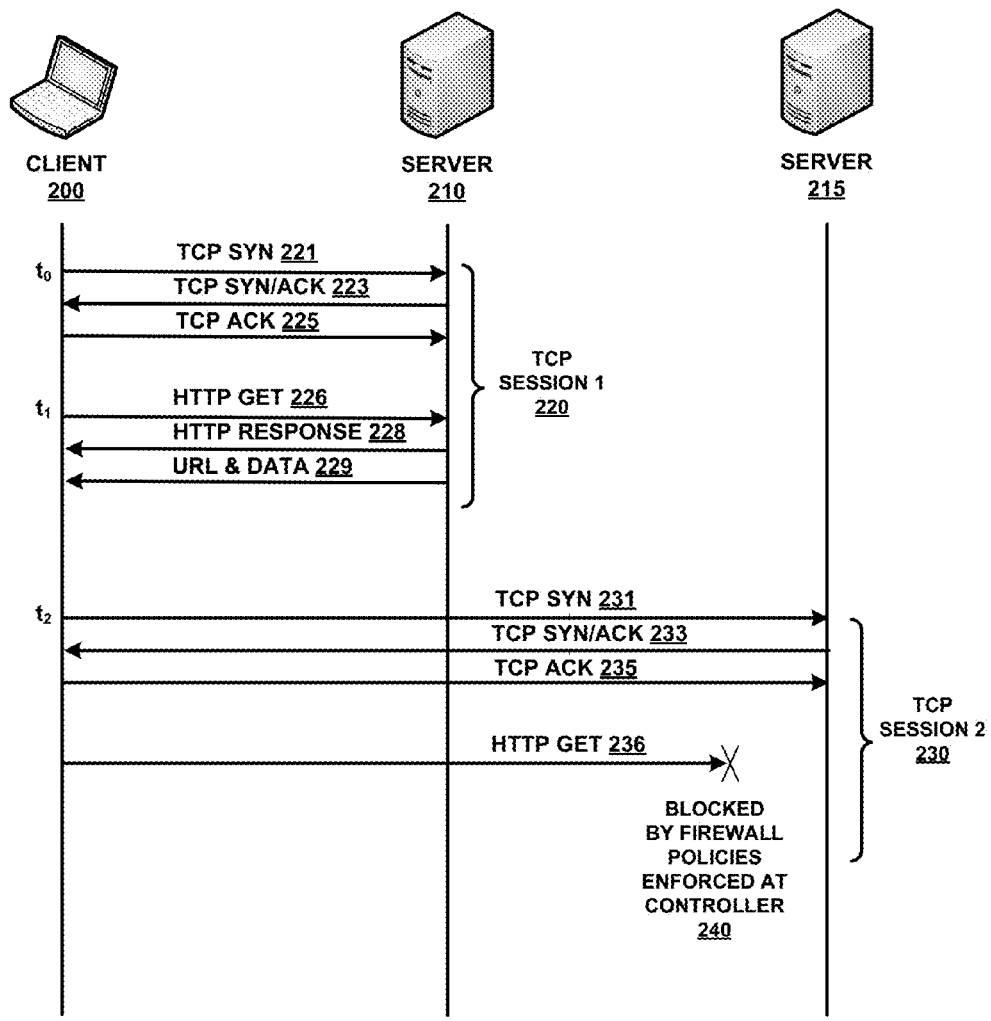
FIG. 2 shows a sequence diagram illustrating exemplary network communication exchanges involved in network policy enforcement without a proxy server according to embodiments of the present disclosure.

FIG. 2 shows a sequence diagram illustrating exemplary network communication exchanges involved in firewall policy enforcement without proxy server according to embodiments of the present disclosure. FIG. 2 includes at least a client device 200, a server 210, and a server 215. Server 210 and server 215 provide different web services and host different website and/or web applications. Network firewall policies typically are configurable by network administrators. In this example, assuming that the network firewall policy allows client access to server 210 but denies client access to server 215.

In order to retrieve a website hosted by server 210 (e.g., cnn.com), client device 200 initiates a three-way handshake to establish a Transmission Control Protocol (TCP) connection at time point $t_0$. The three-way handshake includes at least a TCP SYN message 221 that client device 200 sends to server 210. Client device 200 will set the segment's sequence number to a random value A. In response, server 210 replies with a TCP SYN/ACK message 223. The acknowledgment number is set to be one more than the received sequence number i.e. A+1, and the sequence number that the server chooses for the packet is another random number, B. Finally, client device 200 sends a TCP ACK 225 back to server 210. The sequence number is set to the received acknowledgement value i.e. A+1, and the acknowledgement number is set to one more than the received sequence number i.e. B+1. Thereafter, a full-duplex TCP connection is established.

At time point $t_1$, after establishment of TCP connection, client device 200 will send an HTTP GET message 226 to request a website hosted by server 210 (e.g., cnn.com). Once server 210 receives HTTP GET message 226, server 210 will replies with an HTTP RESPONSE 228, along with a set of uniform resource locators (URLs) and data 229.

The TCP three-way handshake and the HTTP exchanges, e.g., messages 221-229, collectively are completed within a first TCP session, namely TCP session 1 220. Note that, TCP session 1 220 may have child connections, for example, every time when URLs are received, a number of child connections can be established in order to retrieve subcontent of the website as identified by the URLs returned from server 210.

At time point $t_2$, assuming that client device 200 initiates a new TCP session 2 230 to server 215 to access another website (e.g., ebay.com) by a three-way TCP handshake. The three-way TCP handshake includes a TCP SYN message 231 sent from client device 200 to server 215, a TCP SYN/ACK message 233 returned from server 215 to client device 200, and a TCP ACK message 235 sent from client device 200 to server 215. Thereafter, the TCP three-way handshake is followed by a set of HTTP communication exchanges that include an HTTP GET message 236 transmitted from client device 200 to server 215. Because the network firewall policies deny client access to server 215, HTTP GET message 236 will be blocked by the network infrastructure (e.g., a network controller).

Persistent Firewall Policy Enforcement with Proxy Server

Figure 3A:
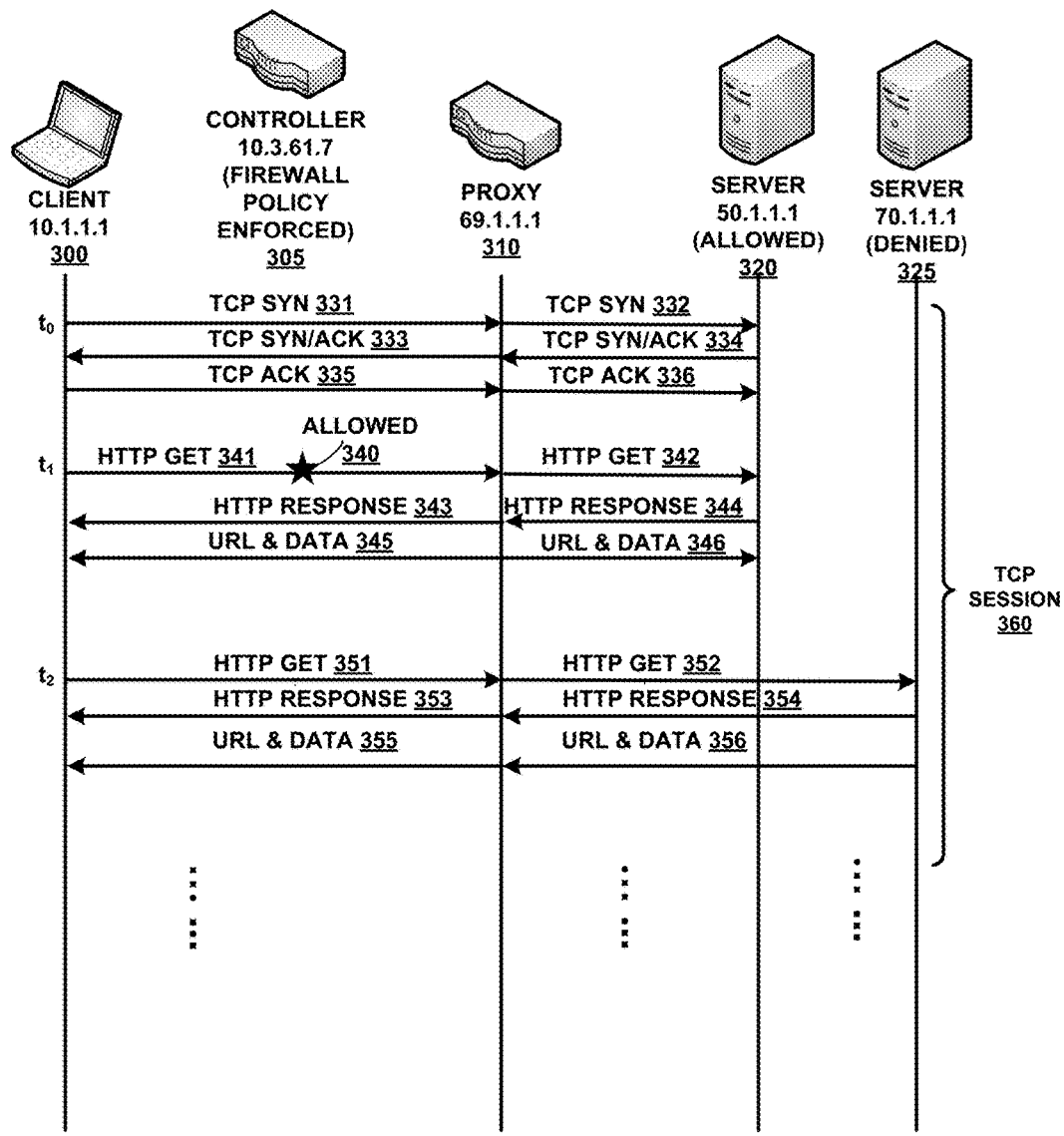
FIG. 3A-3B show sequence diagrams illustrating exemplary network communication exchanges involved in network policy enforcement with a proxy server according to embodiments of the present disclosure.

FIG. 3A shows a sequence diagram illustrating exemplary network communication exchanges involved in firewall policy enforcement with proxy server according to embodiments of the present disclosure. Specifically, FIG. 3A includes at least a client device 300, a network controller 305, a proxy 310, a server 320, and a server 325. Server 320 and server 325 provide different web services and host different website and/or web applications. In this example, assuming that client device 300 has an IP address of 10.1.1.1; network controller 305 has an IP address of 10.3.61.7; proxy 310 has an IP address of 69.1.1.1; server 320 has an IP address of 50.1.1.1; and server 325 has an IP address of 70.1.1.1.

Network firewall policies typically are configurable by network administrators. In this example, assuming that the network firewall policy allows client access to server 320 but denies client access to server 325. Specifically, the network firewall policy may specify that client devices are allowed to access web contents belonging to the category of news, but not web contents belonging to the category of auction. Further, assuming that server 320 hosts cnn.com and server 325 hosts ebay.com. As a result, client devices should be allowed to access server 320 but denied to access server 325.

However, proxy connections often exhibit persistent policy enforcement. For example, during operations, in order to retrieve a website hosted by server 320 (e.g., cnn.com), client device 300 initiates a three-way handshake to establish a Transmission Control Protocol (TCP) connection at time point $t_0$. The three-way handshake includes at least a TCP SYN message 331 that client device 300 sends to proxy 310. Proxy 310 then forwards the message to server 320 as TCP SYN message 332. In response, server 320 replies with a TCP SYN/ACK message 334. The response message is then received by proxy 310 and forwarded to client 300 as TCP SYN/ACK message 333. Finally, client device 300 sends a TCP ACK message 335 back to proxy 310; and, proxy 310 forwards the message as TCP ACK message 336 to server 320. Thereafter, a full-duplex TCP connection is established between client 300 and server 320.

At time point $t_1$, after establishment of TCP connection, client device 300 will send an HTTP GET message 341 to request a website hosted by server 320 (e.g., cnn.com). HTTP GET message 341 is subjected to network policy enforcement at network controller 305. Because the network firewall policies are configured to allow client access to server 320, HTTP GET message 341 is allowed 340 to reach proxy 310 by network controller 305. When proxy 310 receives HTTP GET message 341, it will forward the message as HTTP GET message 342 to server 320.

Once server 320 receives HTTP GET message 342, server 320 will replies with an HTTP RESPONSE 344, along with a set of uniform resource locators (URLs) and data 346. Proxy 310 will forward the messages as HTTP RESPONSE message 343 and URL & data message 345 to client device 300.

The TCP three-way handshake and the HTTP exchanges, e.g., messages 331-346, collectively are completed within a TCP session 360 between client device 300 and proxy 310. Now, assuming that within the same TCP session 360, at time point $t_2$, client device 300 initiates a connection to server 325 to access another website (e.g., ebay.com) by sending a new HTTP GET message 351. Because conventionally, network firewall policies are applied only once during each session, network controller 305 will continue allowing HTTP GET message 351 to reach proxy 310.

Proxy 310 will then forward the message as HTTP GET message 352 to server 325. After server 325 receives HTTP GET message 352, server 325 will reply with an HTTP RESPONSE 354, along with a set of uniform resource locators (URLs) and data 356. Proxy 310 will forward the messages as HTTP RESPONSE message 353 and URL & data message 355 to client device 300. As a result, client device 300 is mistakenly allowed access to server 325 even though the network firewall policy denies client access to server 325. Because HTTP GET message 351 is transmitted within an initially allowed TCP session, subsequent requests will not be blocked by the network infrastructure (e.g., a network controller) even if it was sent to a different server.

Figure 3B:
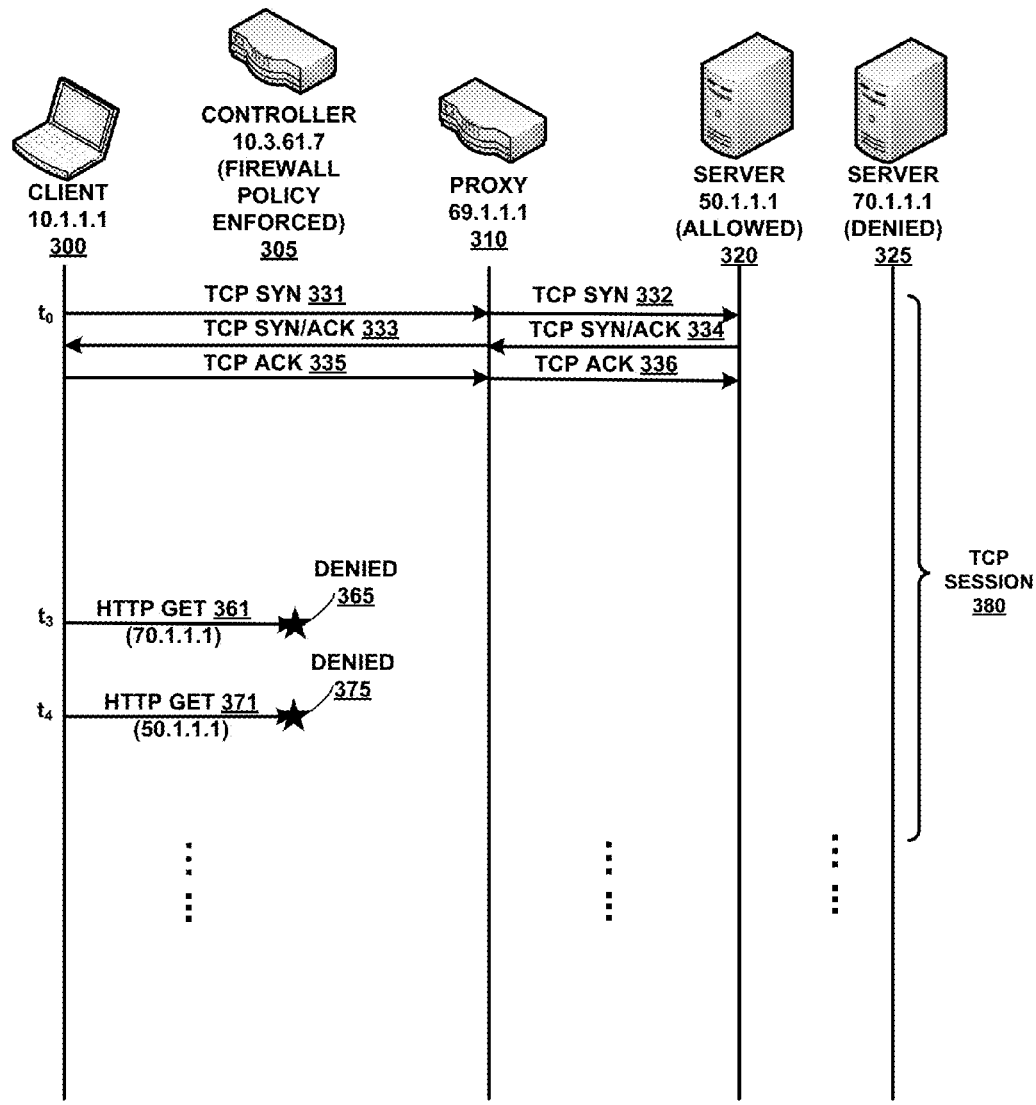

FIG. 3B shows a sequence diagram illustrating exemplary network communication exchanges involved in firewall policy enforcement with proxy server. Specifically, FIG. 3B includes at least a client device 300, a network controller 305, a proxy 310, a server 320, and a server 325. Server 320 and server 325 provide different web services and host different website and/or web applications. In this example, assuming that client device 300 has an IP address of 10.1.1.1; network controller 305 has an IP address of 10.3.61.7; proxy 310 has an IP address of 69.1.1.1; server 320 has an IP address of 50.1.1.1; and server 325 has an IP address of 70.1.1.1.

During operations, in order to retrieve a website hosted by server 320 (e.g., ebay.com), client device 300 initiates a three-way handshake to establish a Transmission Control Protocol (TCP) connection at time point $t_0$. The three-way handshake includes at least a TCP SYN message 331 that client device 300 sends to proxy 310. Proxy 310 then forwards the message to server 320 as TCP SYN message 332. In response, server 320 replies with a TCP SYN/ACK message 334. The response message is then received by proxy 310 and forwarded to client 300 as TCP SYN/ACK message 333. Finally, client device 300 sends a TCP ACK message 335 back to proxy 310; and, proxy 310 forwards the message as TCP ACK message 336 to server 320. Thereafter, a full-duplex TCP connection is established between client 300 and server 320.

At time point $t_3$, after establishment of TCP connection, client device 300 will send an HTTP GET message 361 to request a website hosted by server 325 (e.g., ebay.com). HTTP GET message 361 is subjected to network policy enforcement at network controller 305. Because the network firewall policies are configured to deny client access to server 325, HTTP GET message 361 is blocked by network controller 305, thus unable to reach proxy 310.

Subsequently, at time point $t_4$, client device 300 sends an HTTP GET message 371 to request a website hosted by server 320 (e.g., cnn.com). Because HTTP GET message 371 is not subjected to network policy enforcement at network controller 305, network controller 305 will continue blocking HTTP GET messages, including HTTP GET message 371. As a result, HTTP GET message 371 is unable to reach proxy 310, even though network firewall policy is configured to allow client access to server 320.

Stateful Firewall Policy Enforcement with Proxy Server

According to embodiments of the present disclosure, the stateful firewall stack running on the network controller subjects the first packet of a new connection to access control list (ACL) lookup to determine whether the session should be permitted or denied. If the ACL has any application-based rules, the firewall stack leaks the packets till the session is web-content categorized or application-classified. Depending on the ordering of the rules in ACL, it waits for either of the result or for both results before proceeding for post-classification application-based policy enforcement.

Till the session is application classified or web-content categorized, the firewall stack sends the packets to DPI engine running in the datapath. The firewall stack registers for events with the DPI engine to invoke corresponding event handlers in the firewall stack.

Some of the events include, but not limited to: URI (URL path); MIME Type (content type of the web page); host name; location (destination address where client is redirected to); server; referrer; etc. The events are generated by the DPI engine when any of the above HTTP attributes are retrieved from the packet.

Detection of Proxy Connection

A. URI Inspection

One way to detect a proxy connection is by inspecting the HTTP GET request, specifically, the URI in the HTTP GET message. FIGS. 4A-4B illustrates difference in the HTTP GET request to a non-proxy server versus a proxy server. The HTTP GET request to a HTTP proxy uses an absolute URI, instead of relative URI in non-proxy HTTP GET requests. For example, FIG. 4A illustrates fields in a HTTP GET request to a non-proxy server. In FIG. 4A, request URI field 400 has the value of "/news" and host field 420 has the value of "www.cnn.com\r\n." By contrast, FIG. 4B illustrates fields in a HTTP GET request to a proxy server. In FIG. 4B, request URI field 400 has the value of "www.cnn.com/news" and host field 420 has the value of "www.cnn.com\r\n."

When the DPI engine generates URI events to the firewall stack, the stack checks if the URI retrieved from the packet is a relative URI or an absolute URI. If it's found to be absolute URI, then the connection is detected as a proxy connection.

B. HTTP CONNECT Message Detection

Figure 5A:
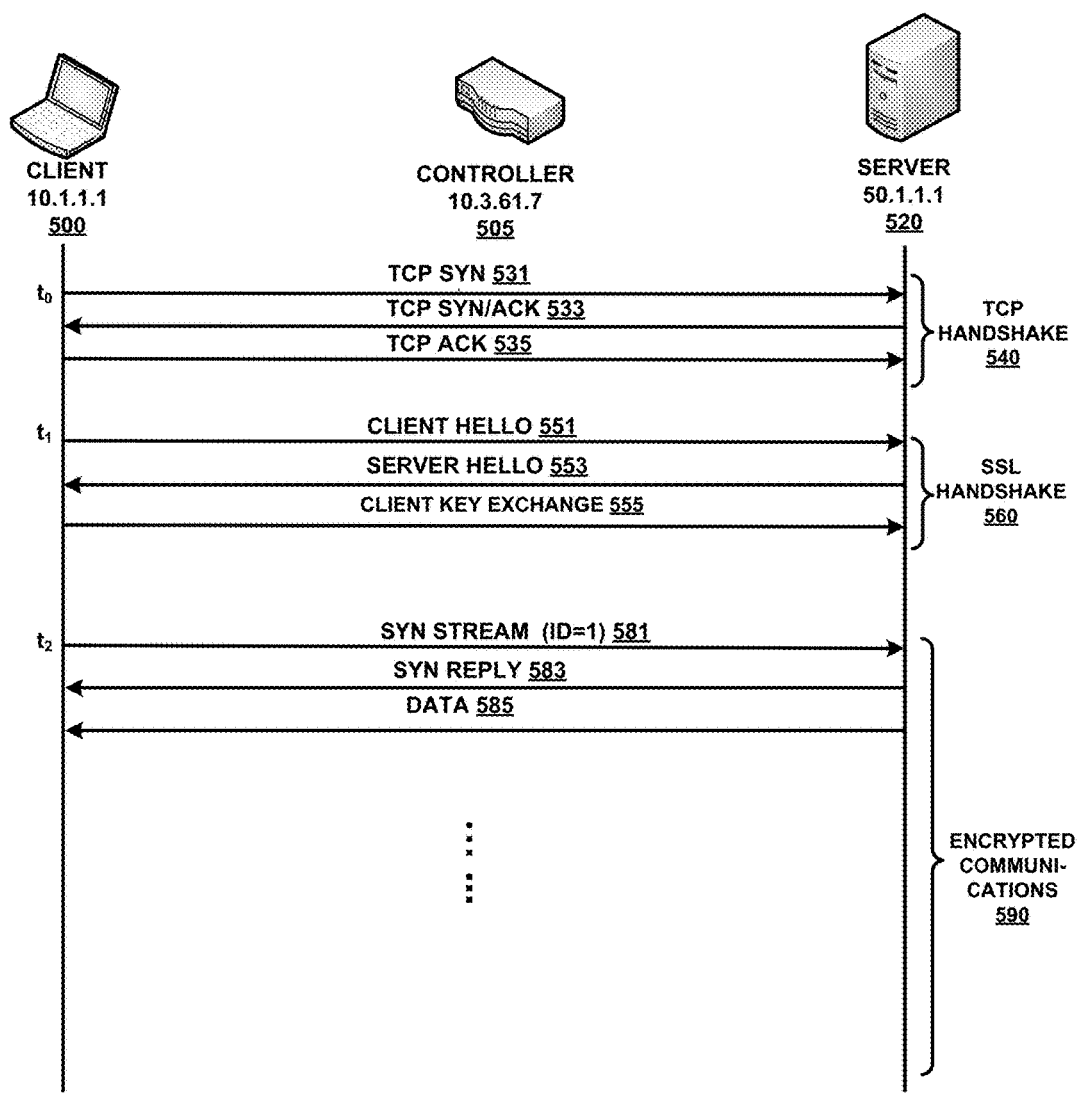
FIG. 5A shows a sequence diagram illustrating exemplary network communication exchanges involved in HTTPS protocol without a proxy server according to embodiments of the present disclosure.
Figure 5B:
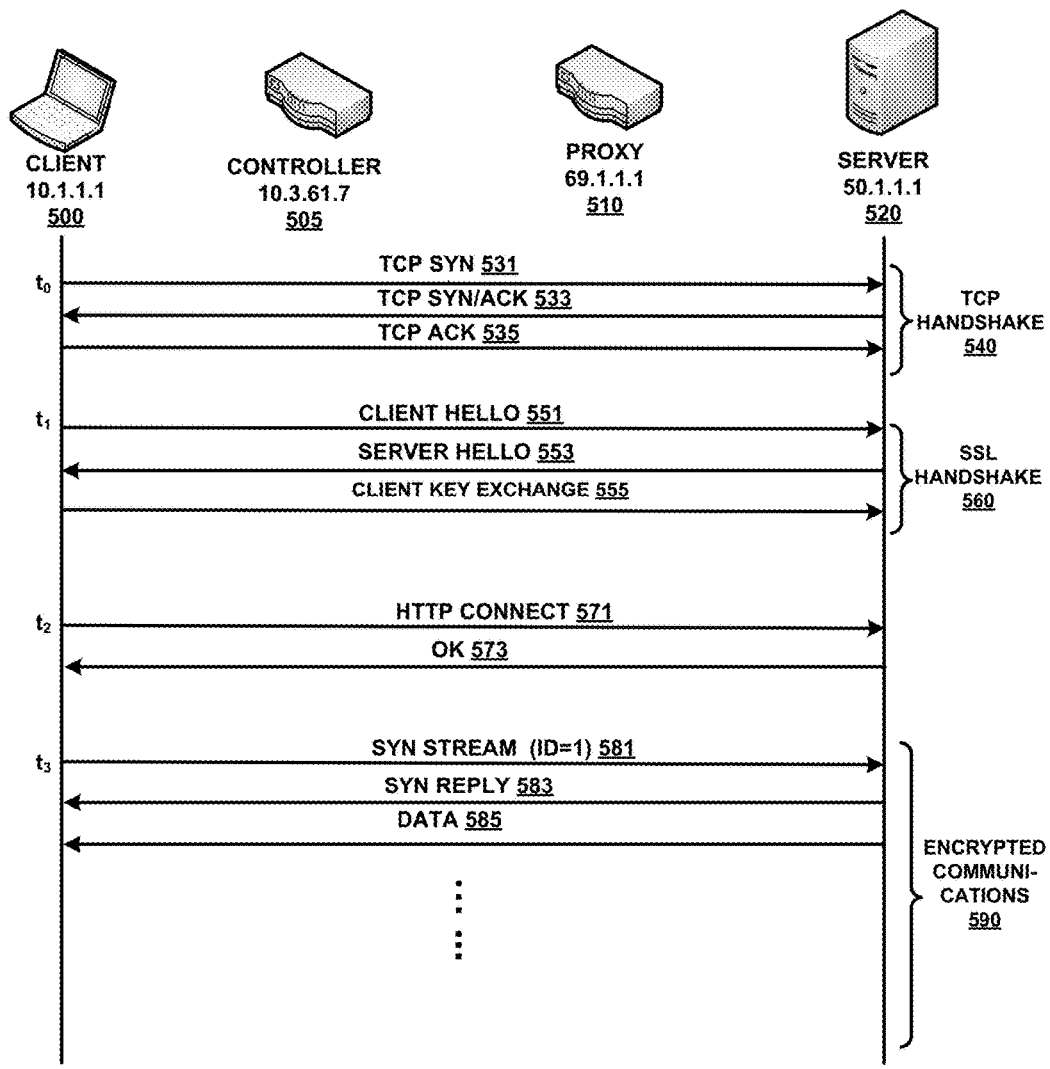
FIG. 5B shows a sequence diagram illustrating exemplary network communication exchanges involved in HTTPS protocol with a proxy server according to embodiments of the present disclosure.

Another way to detect proxy connection as applied to HTTPS protocol is by detecting whether HTTP CONNECT message is received after TCP three-way handshake message exchanges. FIGS. 5A-5B illustrate differences in communication exchanges involved in HTTPS protocol without and with a proxy server.

Specifically, FIG. 5A includes at least a client device 500, a network controller 505, and a server 520. In this example, assuming that client device 500 has an IP address of 10.1.1.1; network controller 505 has an IP address of 10.3.61.7; and server 520 has an IP address of 50.1.1.1.

During operations, in order to retrieve secure contents from a website hosted by server 520 (e.g., cnn.com), client device 500 initiates a three-way TCP handshake 540 to establish a TCP connection at time point $t_0$. Three-way TCP handshake 540 includes at least a TCP SYN message 531 that client device 500 sends to server 520. In response, server 520 replies with a TCP SYN/ACK message 533. Finally, client device 500 sends a TCP ACK message 535 back to server 520. Thereafter, a full-duplex TCP connection is established between client 500 and server 520.

At time point $t_1$, after establishment of TCP connection, client device 500 will start SSL handshake 560 by sending a CLIENT HELLO message 551 to server 520 (e.g., cnn.com). In response, server 520 will reply with a SERVER HELLO message 553. Then, client device 500 will send client key exchange message 555.

Thereafter, at time point $t_2$, client device 500 and server 520 will be exchanging encrypted communications 590. For example, client device 500 may send a SYN STREAM message 581 with identifier ID=1 to server 520. In response, server 520 may respond with SYN REPLY message 583 and data 585. Messages 581-585 and all subsequent messages in the same session are encrypted. Only client device 500 and server 520 can use the crypto keys to decrypt these messages. No proxy server will be able to inspect the content of these encrypted messages.

Referring now to FIG. 5B, the communication exchanges here involve at least a client device 500, a network controller 505, a proxy 510, and a server 520. In this example, assuming that client device 500 has an IP address of 10.1.1.1; network controller 505 has an IP address of 10.3.61.7; proxy 510 has an IP address of 69.1.1.1; and server 520 has an IP address of 50.1.1.1.

Similar to the scenario without proxy server 510, during operations, in order to retrieve secure contents from a website hosted by server 520 (e.g., cnn.com), client device 500 initiates a three-way TCP handshake 540 to establish a TCP connection at time point $t_0$. Three-way TCP handshake 540 includes at least a TCP SYN message 531 that client device 500 sends to server 520. In response, server 520 replies with a TCP SYN/ACK message 533. Finally, client device 500 sends a TCP ACK message 535 back to server 520. Thereafter, a full-duplex TCP connection is established between client 500 and server 520.

At time point $t_1$, after establishment of TCP connection, client device 500 will start SSL handshake 560 by sending a CLIENT HELLO message 551 to server 520 (e.g., cnn.com). In response, server 520 will reply with a SERVER HELLO message 553. Then, client device 500 will send client key exchange message 555.

Thereafter, unlike in the scenario without a proxy server, at time point $t_2$, client device 500 will send an HTTP CONNECT message 571 to server 520. Upon receiving HTTP CONNECT message 571, server 520 will respond with an OK message 573.

Upon receiving OK message 573 from server 520, client device 500 and server 520 will be exchanging encrypted communications 590. For example, client device 500 may send a SYN STREAM message 581 with identifier ID=1 to server 520. In response, server 520 may respond with SYN REPLY message 583 and data 585. Messages 581-585 and all subsequent messages in the same session are encrypted. Only client device 500 and server 520 can use the crypto keys to decrypt these messages.

Because the HTTP CONNECT message is not encrypted, it can be detected by the DPI engine. When the DPI engine detects an HTTP CONNECT message from a client device, the connection is detected as a proxy connection.

C. Time-To-Live (TTL)

The time-to-live (TTL) value generally refers to an upper bound on the time that an IP datagram can exist in an Internet. The TTL field is set by the sender of the IP datagram, and reduced by every router on the route to its destination. If the TTL field reaches zero before the datagram arrives at its destination, then the datagram is discarded and an error datagram is sent back to the sender. TTL field is used to avoid undeliverable datagrams circulating on an Internet.

The TTL value can be retrieved from the IP header in the SYN ACK message received from a server. Because TTL value is typically fixed for each web application and/or server, the network controller may be able to use TTL value to determine whether the current session is a proxy connection if the TTL for the proxy is known.

D. Destination IP Address

Moreover, the network controller can inspect the destination IP addresses for multiple sessions. If the destination IP addresses are the same, then the client device is likely communicating to a proxy server. This detection mechanism may not be able to reliably detect proxy connection. However, it can be combined with other detection mechanisms to improve the chance of proxy detection.

E. List of Known Proxy Servers

In some embodiments, network controller can maintain a list of known proxy servers and their corresponding IP addresses. If the DPI engine inspects the destination address of a packet and determines that it exists in the list of known proxy servers, then the network controller can determine that the current session is a proxy connection.

The above detection mechanisms are only examples of proxy detection mechanisms that can be used in accordance to embodiments of the present disclosure. It is by no means an exhaustive list. Other proxy detection mechanisms can be used without departing from the spirit of the present disclosure.

Application-Based Policies

A. Web Content Categorization

The absolute URI retrieved by the DPI engine is subjected to URL cache lookup in the datapath. If any entry is found, then the session is classified as belonging to the corresponding web content category. If no entry is found, then a URL miss message is generated to the control plane, which will program the cache entry in the datapath after cache-lookup in the control plane or cloud lookup.

B. Application Classification

The DPI engine in the datapath uses various HTTP attributes to classify the session as a particular application. The DPI engine is usually programmed with a limited number of applications. For HTTP based traffic, the DPI engine usually classifies the session on the receipt of the first data packet, which is the HTTP GET request from the client device. For certain types of applications, it might need more than one data packet to classify the session. Once the session is classified, the DPI engine generates an event.

C. Application Policy Enforcement

Once the session is terminally classified as an application and/or categorized as a specific web-content category, the firewall stack subjects the session through application-based policy enforcement in the ACL. The application-based firewall policies can be structured in any order according to the requirements of the customer.

If post-classification application policy enforcement permits the session, the session is marked with appropriate flags, and subsequent packets are permitted. However if the enforcement results in denying the session, the session is marked with DENY flag, and subsequent packets are dropped in the firewall.

D. Session Transition

A session, once detected as a proxy connection, is monitored continuously in the datapath to detect transition to different application or web-content category. Since the DPI engine usually determines the classification based on HTTP request headers, the firewall stack inspects for HTTP GET requests from the client device. Only the HTTP GET request packets are sent to DPI engine for application classification.

The firewall stack subjects the URI retrieved to cache lookup to determine the web-content category of the HTTP request. Also the event handler invoked as a result of application classification will detect the change in the application. If either of the results changed, the session is re-subjected to application based policy enforcement.

Figure 6:
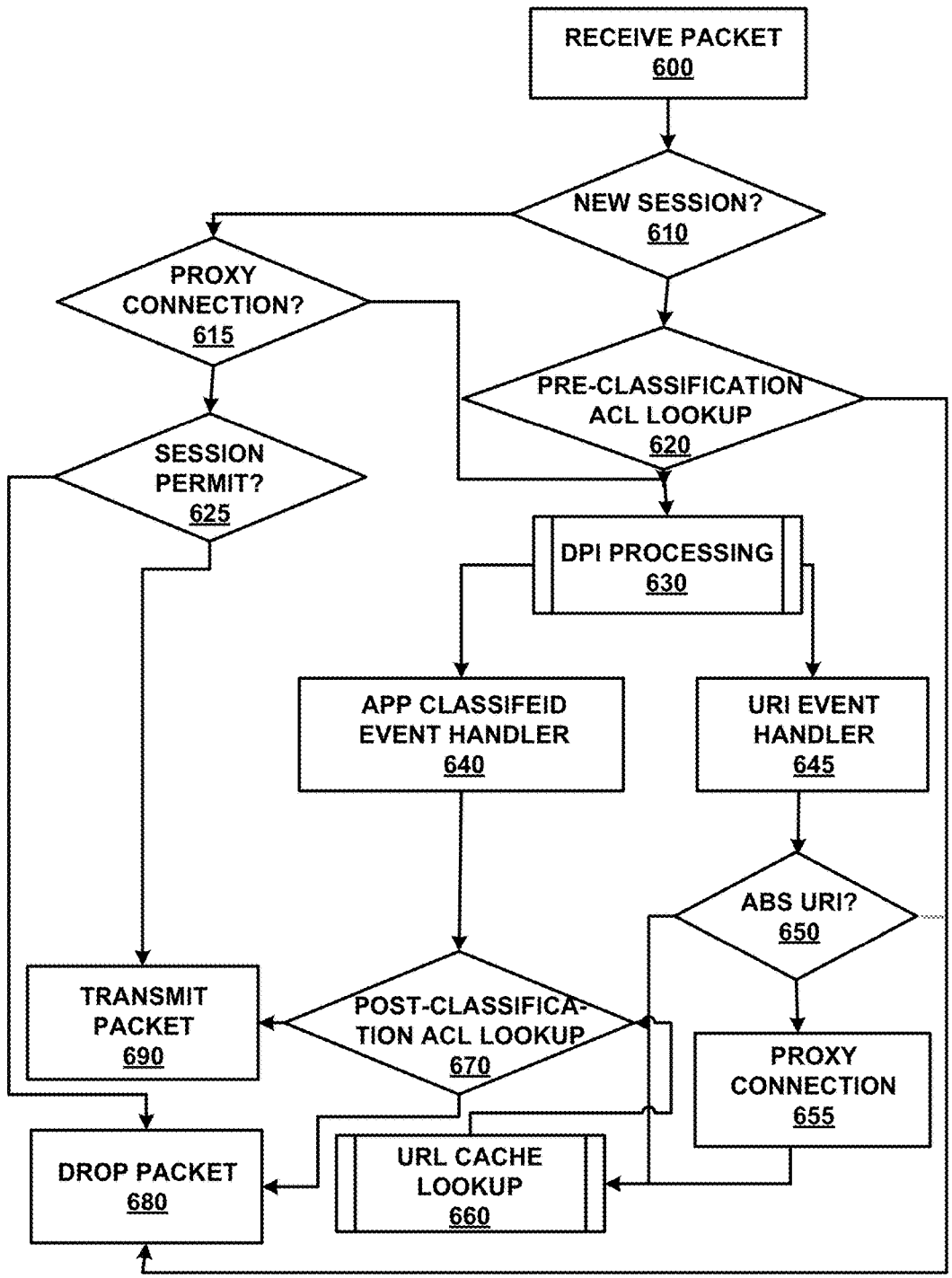
FIG. 6 illustrates an exemplary process for performing dynamic detection and application-based policy enforcement of proxy connections according to embodiments of the present disclosure.

Process for Dynamic Detection and Application-Based Policy Enforcement of Proxy Connections FIG. 6 illustrates an exemplary process for performing dynamic detection and application-based policy enforcement of proxy connections according to embodiments of the present disclosure. Specifically, a network device receives a packet (operation 600) and then determines whether the packet is from a new session (operation 610).

If the packet is from a new session, the network device performs pre-classification ACL lookup (operation 620). If the ACL entry indicates that the session is denied, the network device will proceed to drop the packet (operation 680). If, however, the ACL entry indicates that the session is allowed, the network device continues to deep packet inspection processing (operation 630).

If the packet is associated with a web application session, the network device will invoke the application classified event handler 640 and proceed to post-classification ACL lookup (operation 670).

If the packet is associated with web content retrieval, the network device will invoke the URL event handler 645. Furthermore, the network device will determine whether the URI is an absolute URI (operation 650). If so, the session is determined to be a proxy session (operation 655). Next, the network device performs a URL cache lookup (operation 660) and proceeds to post-classification ACL lookup (operation 670).

If the post-classification ACL lookup indicates that the session is allowed, the network device will transmit the packet (operation 690). If the post-classification ACL lookup indicates that the session is denied, the network device will drop the packet (operation 680).

If the packet is not from a new session as determined during operation 610, the network device further determines whether the current session is a proxy session (operation 615). If the session is a proxy session, the network device will continuously subject the packets to DPI processing if a change in application classification and/or web content category which may affect network firewall policy decisions is detected (operation 630).

If the session is not a proxy session, then the network device determines whether the current session is permitted (operation 625). If so, the network device transmits the packet (operation 690). If not, the network device drops the packet (operation 680).

Figure 7:
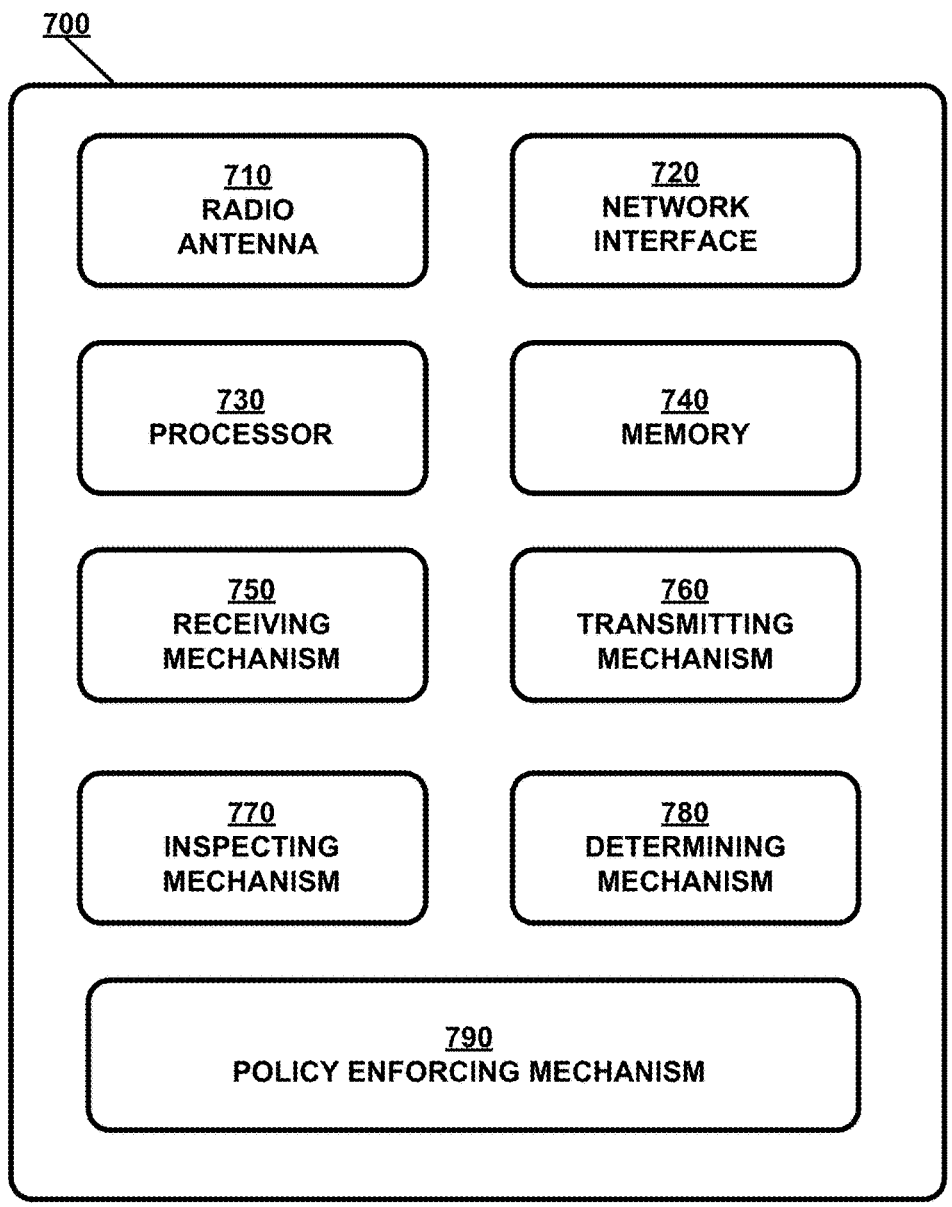
FIG. 7 is a block diagram illustrating an exemplary system for performing dynamic detection and application-based policy enforcement of proxy connections according to embodiments of the present disclosure.

System for Dynamic Detection and Application-Based Policy Enforcement of Proxy Connections FIG. 7 is a block diagram illustrating an exemplary system for performing according to embodiments of the present disclosure. Network device 700 includes at least one or more radio antennas 710 capable of either transmitting or receiving radio signals or both, a network interface 720 capable of communicating to a wired or wireless network, a processor 730 capable of processing computing instructions, and a memory 740 capable of storing instructions and data. Moreover, network device 700 further includes a receiving mechanism 750, a transmitting mechanism 760, an inspecting mechanism 770, a determining mechanism 780, and a policy enforcing mechanism 790, all of which are in communication with processor 730 and/or memory 740 in network device 700. Network device 700 may be used as a client system, or a server system, or may serve both as a client and a server in a distributed or a cloud computing environment.

Radio antenna 710 may be any combination of known or conventional electrical components for receipt of signaling, including but not limited to, transistors, capacitors, resistors, multiplexers, wiring, registers, diodes or any other electrical components known or later become known.

Network interface 720 can be any communication interface, which includes but is not limited to, a modem, token ring interface, Ethernet interface, wireless IEEE 802.11 interface, cellular wireless interface, satellite transmission interface, or any other interface for coupling network devices.

Processor 730 can include one or more microprocessors and/or network processors. Memory 740 can include storage components, such as, Dynamic Random Access Memory (DRAM), Static Random Access Memory (SRAM), etc.

Receiving mechanism 750 generally receives one or more network messages via network interface 720 or radio antenna 710 from a wireless client. The received network messages may include, but are not limited to, requests and/or responses, beacon frames, management frames, control path frames, and so on. Specifically, receiving mechanism 750 can receive, from a client device, a packet in a session. Moreover, subsequent to receiving the packet from the client device; receiving mechanism 750 may receive another packet destined to a proxy in the same session.

Transmitting mechanism 760 generally transmits messages, which include, but are not limited to, requests and/or responses, beacon frames, management frames, control path frames, and so on. Specifically, transmitting mechanism 760 can transmit a packet to a proxy if the packet is permitted.

Inspecting mechanism 770 generally inspects received packets. Specifically, inspecting mechanism 770 can filtering a received packet based on a packet type, and perform deep packet inspection on the received packet to determine if the content in the payload of the packet satisfies certain criteria.

Determining mechanism 780 generally determines whether a received packet is transmitted to a proxy. In response to determining that the packet is transmitted to the proxy, determining mechanism 780 further determines whether the packet is associated with a new application classification or web content category than an application classification or web content category that is previously determined during the same session.

In some embodiments, determining mechanism 780 determines that the other packet is associated with a new uniform resource locator (URL) than the packet received from the client device. Furthermore, determining mechanism 780 can determine whether the other packet is associated with the same web content category as the packet received from the client device.

In some embodiments, determining mechanism 780 determines whether a request URI field in a header of an HTTP GET message includes an absolute URL. In response to the request URI field including an absolute URL, determining mechanism 780 determines that the packet is transmitted to the proxy. In response to the request URI field not including an absolute URL, determining mechanism 780 determines that the packet is transmitted to a non-proxy destination.

In some embodiments, determining mechanism 780 determines whether an HTTP CONNECT message is received from the client device subsequent to establishing a TCP connection. In response to the HTTP CONNECT message being received from the client device, determining mechanism 780 determines that the packet is transmitted to the proxy. In response to the HTTP CONNECT message not being received from the client device, determining mechanism 780 determines that the packet is transmitted to a non-proxy destination.

In some embodiments, determining mechanism 780 retrieves a time-to-live (TTL) value from a SYN ACK message received from a server, and determines whether the retrieved TTL value is associated with a proxy.

In some embodiments, determining mechanism 780 retrieves destination IP addresses from a set of packets, and determines whether the destination IP addresses are same in the set of packets. In response to the destination IP addresses being same in the set of packets, determining mechanism 780 determines that the packet is transmitted to the proxy. In response to the destination IP addresses being different in the set of packets, determining mechanism 780 determines that the packet is transmitted to a non-proxy destination Policy enforcing mechanism 790 generally enforces network firewall policies. Specifically, policy enforcing mechanism 790 can apply network firewall policies to determine whether to allow or deny transmission of the packet to the proxy in response to the packet being associated with a different application classification or web content category. When the packet is associated with a new application classification, policy enforcing mechanism 790 will apply the network firewall policies based on the new application classification. Note that, the packet may be previously associated with a different application classification, or previously associated with a web content category. When the packet is associated with a new web content category, policy enforcing mechanism 790 will apply the network firewall policies based on the new web content category.

If a packet is associated with the same web content category as previously received packets from the client device, policy enforcing mechanism 790 will refrain from network policy enforcement on traffic associated with a new URL. If a packet is associated with a different web content category as previously received packets from the client device, policy enforcing mechanism 790 will perform network policy enforcement on the traffic associated with the new URL.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed cause a network system to:
   receive, from a client device, a packet in a session;
   determine whether the packet is transmitted to a proxy;
   in response to determining that the packet is transmitted to the proxy, determine whether the packet is associated with a new application classification or web content category different than an application classification or web content category that was previously determined during the same session; and
   in response to determining that the packet is associated with the new application classification or web content category, apply a network firewall policy to determine whether to allow or deny transmission of the packet to the proxy.

2. The non-transitory computer readable medium of claim 1, wherein the instructions when executed cause the network system to:
receive another packet destined to the proxy in the same session subsequent to receiving the packet from the client device;
filter the other packet based on a packet type; and
perform deep packet inspection and apply the network firewall policy on the other packet.

3. The non-transitory computer readable medium of claim 1, wherein the packet is associated with the new application classification, and the instructions when executed cause the network system to apply the network firewall policy based on the new application classification.

4. The non-transitory computer readable medium of claim 3, wherein the packet was previously associated with a different application classification.

5. The non-transitory computer readable medium of claim 3, wherein the packet was previously associated with a web content category.

6. The non-transitory computer readable medium of claim 1, wherein the packet is associated with the new web content category, and the instructions when executed cause the network system to apply the network firewall policy based on the new web content category.

7. The non-transitory computer readable medium of claim 2, wherein the instructions when executed cause the network system to:
determine that the other packet is associated with a new uniform resource locator (URL) different from a URL of the packet received from the client device; and
determine whether the other packet is associated with the same web content category as the packet received from the client device.

8. The non-transitory computer readable medium of claim 7, wherein the instructions when executed cause the network system to:
in response to the other packet being associated with the same web content category as the packet received from the client device, refrain from network policy enforcement on traffic associated with the new URL; and
in response to the other packet being associated with a different web content category as the packet received from the client device, perform network policy enforcement on the traffic associated with the new URL.

9. The non-transitory computer readable medium of claim 1, wherein determining whether the packet is transmitted to the proxy comprises:
determining whether a request Uniform Resource Identifier (URI) field in a header of a Hypertext Transfer Protocol (HTTP) GET message includes an absolute URI;
in response to the request URI field including an absolute URI, determining that the packet is transmitted to the proxy; and
in response to the request URI field not including an absolute URI, determining that the packet is transmitted to a non-proxy destination.

10. The non-transitory computer readable medium of claim 1, wherein determining whether the packet is transmitted to the proxy comprises:
determining whether an HTTP CONNECT message is received from the client device subsequent to establishing a Transmission Control Protocol (TCP) connection;
in response to the HTTP CONNECT message being received from the client device, determining that the packet is transmitted to the proxy; and
in response to the HTTP CONNECT message not being received from the client device, determining that the packet is transmitted to a non-proxy destination.

11. The non-transitory computer readable medium of claim 1, wherein determining whether the packet is transmitted to the proxy comprises:
retrieving a time-to-live (TTL) value from a SYN ACK message received from a server; and
determining whether the retrieved TTL value is associated with the proxy.

12. The non-transitory computer readable medium of claim 1, wherein determining whether the packet is transmitted to the proxy comprises:
retrieving destination Internet Protocol (IP) addresses from a set of packets;
determining whether the destination IP addresses are same in the set of packets;
in response to the destination IP addresses being same in the set of packets, determining that the packet is transmitted to the proxy; and
in response to the destination IP addresses being different in the set of packets, determining that the packet is transmitted to a non-proxy destination.

13. A system comprising:
a network interface to communicate over a network; and
a hardware processor to:
receive, from a client device, a packet in a session;
determine whether the packet is transmitted to a proxy;
in response to determining that the packet is transmitted to the proxy, determine whether the packet is associated with a new application classification or web content category different than an application classification or web content category that was previously determined during the same session; and
in response to determining that the packet is associated with the new application classification or web content category, apply a network firewall policy to determine whether to allow or deny transmission of the packet to the proxy.

14. The system of claim 13, wherein the hardware processor is to:
receive another packet destined to the proxy in the same session subsequent to receiving the packet from the client device;
filter the other packet based on a packet type; and
perform deep packet inspection and apply the network firewall policy on the other packet.

15. The system of claim 13, wherein the packet is associated with the new application classification, and the hardware processor is to apply the network firewall policy based on the new application classification.

16. The system of claim 13, wherein the packet is associated with the new web content category, and the hardware processor is to apply the network firewall policy based on the new web content category.

17. The system of claim 14, wherein the hardware processor is to:
determine that the other packet is associated with a new uniform resource locator (URL) different from a URL of the packet received from the client device;
determine whether the other packet is associated with the same web content category as the packet received from the client device;

in response to the other packet being associated with the same web content category as the packet received from the client device, refrain from network policy enforcement on traffic associated with the new URL; and in response to the other packet being associated with a different web content category as the packet received from the client device, perform network policy enforcement on the traffic associated with the new URL.

18. The system of claim 13, wherein determining whether the packet is transmitted to the proxy comprises:

determining whether a request Uniform Resource Identifier (URI) field in a header of a Hypertext Transfer Protocol (HTTP) GET message includes an absolute URI;

in response to the request URI field including an absolute URI, determining that the packet is transmitted to the proxy; and in response to the request URI field including a relative URI, determining that the packet is transmitted to a non-proxy destination.

19. The system of claim 13, wherein determining whether the packet is transmitted to the proxy comprises:

determining whether an HTTP CONNECT message is received from the client device subsequent to establishing a Transmission Control Protocol (TCP) connection;

in response to the HTTP CONNECT message being received from the client device, determining that the packet is transmitted to the proxy; and in response to the HTTP CONNECT message not being received from the client device, determining that the packet is transmitted to a non-proxy destination.

20. The system of claim 13, wherein determining whether the packet is transmitted to the proxy comprises:

retrieving a time-to-live (TTL) value from a SYN ACK message received from a server; and determining whether the retrieved TTL value is associated with the proxy.

21. The system of claim 13, wherein determining whether the packet is transmitted to the proxy comprises:

retrieving destination Internet Protocol (IP) addresses from a set of packets;

determining whether the destination IP addresses are same in the set of packets;

in response to the destination IP addresses being same in the set of packets, determining that the packet is transmitted to the proxy; and in response to the destination IP addresses being different in the set of packets, determining that the packet is transmitted to a non-proxy destination.

* * * * *